United States Patent [19]

Snyder, Jr.

[11] 3,856,920

[45] Dec. 24, 1974

[54] RECOVERY OF GALLIUM OXIDE FROM SOLUTIONS

[75] Inventor: Harry C. Snyder, Jr., Belleville, Ill.

[73] Assignee: Aluminum Company of America, Pittsburgh, Pa.

[22] Filed: May 22, 1972

[21] Appl. No.: 255,522

[52] U.S. Cl. ............... 423/122, 423/129, 423/624
[51] Int. Cl. .................... C01f 7/18, C01g 15/00
[58] Field of Search ........... 423/119, 121, 122, 624, 423/625, 129

[56] References Cited
UNITED STATES PATENTS

| | | | |
|---|---|---|---|
| 1,943,786 | 1/1934 | Cowles | 423/625 |
| 2,574,008 | 11/1951 | Beja | 423/121 |
| 2,582,376 | 1/1952 | Frary | 423/122 |

FOREIGN PATENTS OR APPLICATIONS

| | | | |
|---|---|---|---|
| 1,525,133 | 2/1967 | France | 423/122 |
| 227,745 | 5/1958 | Australia | 423/119 |

OTHER PUBLICATIONS

Lundquist & Leach "Solubility Characteristics of NaAlO2" U.S. Dept. Interior, Bureau of Mines Report 6504 pp. 17 (1964).

Permyakova & Lileev; Chemical Abstracts, Vol. 63, No. 2657a col. 1, 1965.

*Primary Examiner*—Oscar R. Vertiz
*Assistant Examiner*—Brian E. Hearn
*Attorney, Agent, or Firm*—Edward B. Foote

[57] ABSTRACT

Method for recovery of gallium from sodium aluminate solutions by co-precipitation of alumina and gallium oxide, followed by introducing sodium aluminate into the resultant solution to co-precipitate further alumina and gallium oxide.

1 Claim, No Drawings

RECOVERY OF GALLIUM OXIDE FROM SOLUTIONS

This invention relates to the recovery of gallium from sodium aluminate solutions.

BACKGROUND OF THE INVENTION

In the well-known Bayer process for the recovery of alumina from aluminous ores, such as bauxite, by digesting the ore in hot caustic soda solution to form a sodium aluminate solution, followed by precipitation of alumina hydrate from the solution and re-cycling the resultant caustic soda-containing "spent liquor" to digest further bauxite, gallium values in the ore are dissolved and accumulate in the solution in repeated digests until an equilibrium is reached, usually at about 0.1 – 0.2 grams of gallium per liter of solution. Also, sodium aluminate solutions containing a low concentration of dissolved gallium can be produced by digesting in hot caustic soda solution of gallium-containing anode alloy from the well-known three-layer process for the purification of aluminum.

U.S. Pat. Nos. 2,574,008 and 2,582,376 disclose recovering gallium values from sodium aluminate solutions by co-precipitating gallium oxide and alumina by feeding carbon dioxide into the solution, after preliminarily precipitating alumina and thereby decreasing the ratio of alumina to gallium in the solution. In effecting co-precipitation of gallium oxide and alumina in that manner, especially when the co-precipitation is accomplished slowly, from solutions containing low concentrations of gallium, it is uneconomical to recover all of the gallium from the solution, despite feeding enough carbon dioxide that the solution contains a substantial proportion of sodium bicarbonate. Such unprecipitated gallium represents an economic loss.

It is an object of this invention to provide an economical and convenient process for precipitating further gallium oxide following co-precipitation of alumina and gallium oxide from sodium aluminate solutions by introducing carbon dioxide into the solution.

In accordance with the invention, carbon dioxide is fed into gallium-containing sodium aluminate solutions in sufficient amount to co-precipitate alumina and part of the gallium as gallium oxide and form sodium bicarbonate in the solution, after which sodium aluminate is fed into the resultant solution, whereby further alumina and gallium oxide are co-precipitated from the solution. The respective degrees to which dissolved gallium is precipitated by gassing the solution with carbon dioxide, and by adding sodium aluminate to the gassed solution, as described above, ordinarily depends on the relative economy of those respective procedures in the recovery of gallium oxide. Normally, it is economically feasible to precipitate the major portion of the gallium by gassing the solution with carbon dioxide and forming at least 90 g/l of sodium bicarbonate in the solution, prior to adding sodium aluminate to recover further gallium oxide from the solution.

In carrying out the above-mentioned procedure of co-precipitating alumina and gallium oxide by adding sodium aluminate to the solution, the sodium aluminate employed may be either in solid form or in solution, but preferably in the form of a solution. The amount of sodium aluminate added depends on such factors as the amount of gallium oxide to be precipitated, and the proportion of the dissolved gallium present which it is desired to precipitate.

Circulating the co-precipitated alumina and gallium oxide through the solution for an extended time by agitation of the solution and precipitate is effective in promoting precipitation of additional gallium oxide, and whether that procedure is to be used is also a factor to take into consideration in determining the amount of sodium aluminate to be added to the solution. Such agitation can be effected by well-known means for stirring slurries.

The following example illustrates the practice of the invention:

Carbon dioxide was fed into a solution containing 4.6 g/l of alumina, 12.7 g/l of total caustic and 0.169 g/l of dissolved gallium, such gassing being continued over a period of 21 hours, by which time sufficient alumina and gallium oxide had been co-precipitated that the resultant solution contained only 0.091 g/l of dissolved gallium, and less than .02 g/l alumina, together with the 88.7 g/l of sodium bicarbonate. Thereafter a portion of the solution, designated Portion A, was stirred continuously for 48 hours.

Sodium aluminate solution was fed into a second portion (designated Portion B) of the solution resulting from the above-mentioned gassing step, in sufficient amount to add 2.5 g/l of alumina to the solution, and the slurry was stirred continuously for 48 hours at the same rate as was employed in stirring Portion A. At the end of 16 hours alumina and gallium oxide had precipitated from both Portions A and B, but in the case of Portion A the solution still contained 0.073 g/l of dissolved gallium, whereas Portion B contained only 0.004 g/l of dissolved gallium.

I claim:

1. The method of precipitating gallium oxide from sodium aluminate solutions containing dissolved gallium, comprising feeding into the solution sufficient carbon dioxide to co-precipitate alumina and part of the gallium oxide from the solution and produce sodium bicarbonate in the solution, and thereafter co-precipitating further alumina and gallium oxide from the resultant solution by feeding sodium aluminate into that solution.

* * * * *